Figure 1:
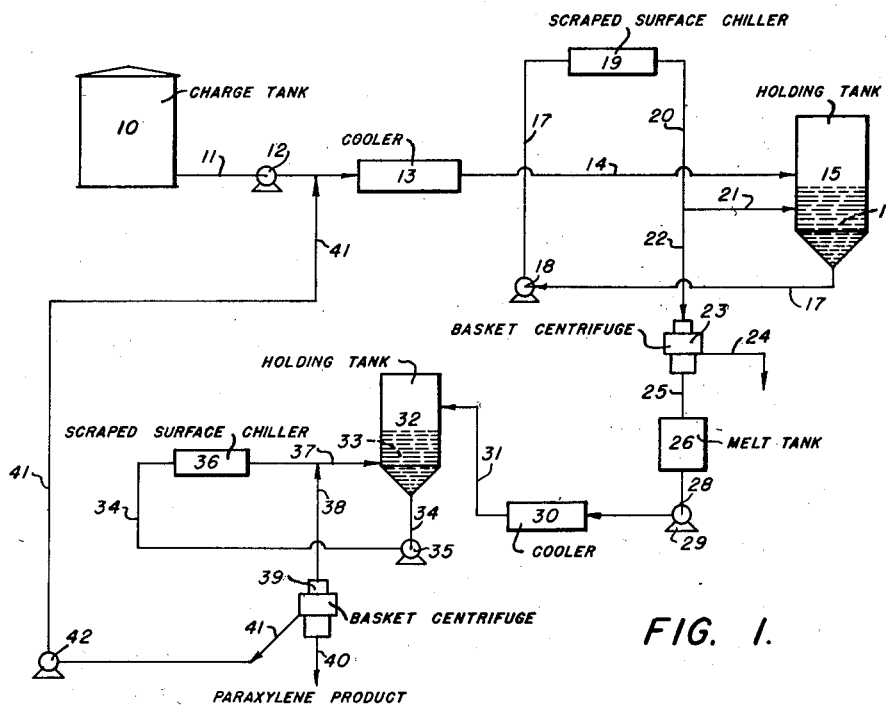

April 23, 1957 R. B. BENNETT 2,790,018

RECOVERY OF PARA XYLENE BY CRYSTALLIZATION

Filed June 9, 1954

INVENTOR.
Rufus B. Bennett.

BY
ATTORNEY.

United States Patent Office 2,790,018
Patented Apr. 23, 1957

2,790,018

RECOVERY OF PARA XYLENE BY CRYSTALLIZATION

Rufus B. Bennett, Baytown, Tex., assignor, by mesne assignments, to Esso Research and Engineering Company, Elizabeth, N. J., a corporation of Delaware Application June 9, 1954, Serial No. 435,446

4 Claims. (Cl. 260—674)

This application is a continuation-in-part of Serial No. 289,501, now abandoned, filed May 23, 1952.

The present application is directed to a process for recovering high purity paraxylene from a hydrocarbon mixture containing paraxylene and at least one other isomeric xylene.

Processes are known for obtaining a mixture of xylenes. As a specific example, in the petroleum refining art it is possible by subjecting fractions to hydroforming and then to distillation to obtain a mixture of isomeric xylenes in which the paraxylene is present in an amount of about 16%. The present invention is directed to a simple, efficient crystallization procedure for recovering paraxylene in substantially pure form from a feed stock containing a low concentration of paraxylene, for example 12 to 25% by volume.

It is an object of the present invention to provide an improved procedure for separating a high concentration paraxylene product from a feed stock containing isomeric xylenes in which paraxylene is present in an amount within the range of 12 to 25% by volume.

Briefly, the process of the present invention is as follows. From the feed stock which contains paraxylene in an amount within the range of 12 to 25% by volume a body of slurry is formed. This body of slurry is held at a temperature below the crystallization temperature of paraxylene and substantially at the eutectic point of paraxylene with the next most easily precipitated component of the feed. An incoming stream of feed stock is chilled but to a temperature above that of said body of slurry and the chilled stream of feed stock is introduced into said body of slurry. The body of slurry is maintained at its temperature at substantially the eutectic point of paraxylene with the next most easily precipitated component of the feed by withdrawing a second stream consisting of a slurry of crystals of paraxylene in mother liquor and this second stream is passed through a scraped surface chiller at a velocity within the range of 100 to 600 feet per minute with a resident time not over two minutes and preferably about 30 seconds and chilled to a temperature below the eutectic point of paraxylene with the next most easily precipitated component but not lower than 3° F. below the eutectic point and a sufficient amount of this chilled material returned to the body of slurry to offset the effect of introducing the warmer stream of feed into the body of slurry as well as heat transferred from the outside into the system. Slurry from the body of slurry is sent to a separating means such as a basket type centrifuge where a first paraxylene filter cake is separated therefrom; preferably the output stream from the scraped surface heat exchanger is split with a portion returned to the body of slurry and the remainder sent to a basket type centrifuge so that the maximum amount of paraxylene crystals is obtained from the slurry without being contaminated with other crystals. It is preferred to treat this first cake in a second step to secure an increased concentration of paraxylene. The cake may be melted and the melted cake from the first stage may be treated by cooling the melt, then chilling it below its crystallization temperature, sending it to a holding tank to permit crystal growth, and then withdrawing slurry from the holding tank to a separating stage such as a basket centrifuge for recovery of a highly purified paraxylene cake.

Figure 2:
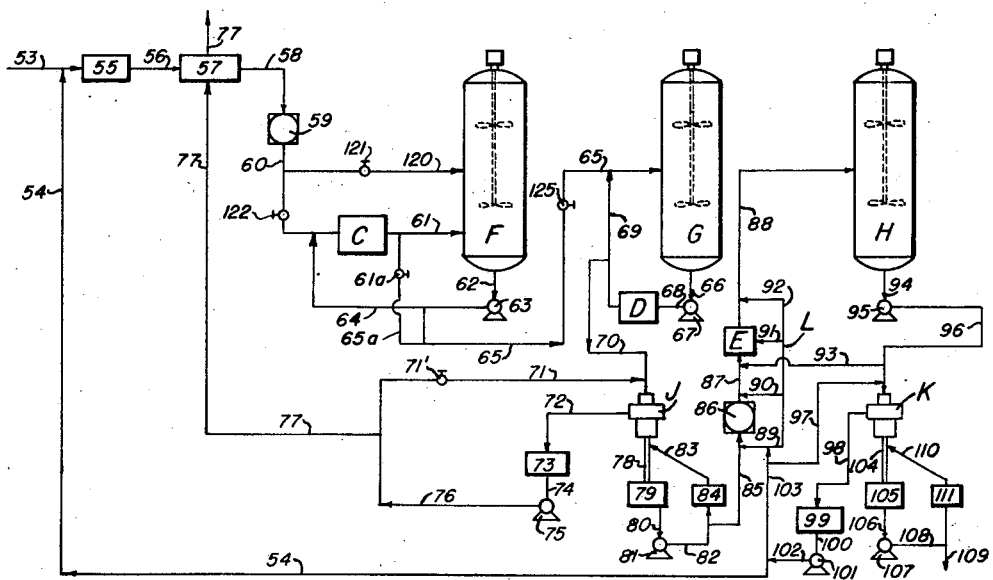

The invention will be further described by reference to the drawing in which:

Fig. 1 is in the form of a flow diagram representing a method for carrying out the invention; and Fig. 2 is in the form of a flow sheet illustrating another method for carrying out the present invention.

Referring now specifically to Fig. 1, a feed stock consisting of a liquid mixture of hydrocarbons which may contain paraxylene in the amount of about 12 to 25% by volume, together with ethylbenzene, metaxylene and orthoxylene is withdrawn from charge tank 10 by line 11 containing pump 12 and passes through cooler 13. In cooler 13 the feed stock is chilled but not to such a temperature as to form paraxylene crystals. A mixture from cooler 13 passes through line 14 to a holding tank 15 which contains a chilled body of slurry 16 consisting of paraxylene crystals in mother liquor. The body of slurry 16 is at a temperature below the crystallization temperature of paraxylene and substantially at but not below the eutectic point of paraxylene with the next most easily precipitated component.

A stream of slurry is withdrawn from holding tank 15 by line 17 containing pump 18 and passed through a scraped surface heat exchanger 19, where its temperature is reduced to a few degrees below the temperature maintained in holding tank 15 to make up for the sensible heat and the heat of crystallization of the incoming feed stock as well as the heat losses occurring in holding tank 15. The scrapers of the scraped surface heat exchanger 19 may operate at a speed in the range of 10 to 20 scrapes per minute. Although the slurry is cooled in scraped surface heat exchanger 19 to a temperature below the eutectic point of paraxylene with the next most easily precipitated component, the time of exposure is such that crystals of material other than paraxylene actually are not formed in the slurry to contaminate the paraxylene product obtained. This result is secured by chilling the slurry in scraped surface heat exchanger 19 to a temperature not lower than 3° F. below the eutectic point with a residence time not over two minutes, and preferably approximately 30 seconds, the velocity of the slurry through the mixture being maintained within the range of 100 feet to 600 feet per minute. It will often be found desirable to use a velocity of 400 feet per minute for the slurry in the scraped surface heat exchanger. By chilling the slurry in this fashion, readily filterable crystals of paraxylene are obtained. Further this procedure insures that the maximum amount of paraxylene crystals is obtained which may be obtained from the solution without contamination from other components introduced in the feed stock.

The slurry is withdrawn from heat exchanger 19 through line 20 and the stream split with a major portion returned through branch line 21 to holding tank 15 and a minor portion passed through branch line 22 to a separating zone, for example a basket centrifuge 23 where the slurry is separated into a cake and a mother liquor fraction. The mother liquor is withdrawn from the centrifuge through line 24. The cake is withdrawn from the centrifuge through discharge line 25 and passes to melt tank 26.

The melt is withdrawn from melting tank 26 by line 28 containing pump 29 and passed into cooler 30. In cooler 30 the melt is cooled but not to such a temperature to form paraxylene crystals and the mixture free from crystals passes by line 31 into a second holding tank 32. Maintained within holding tank 32 is a body of slurry 33 consisting of paraxylene crystals in mother liquor at a temperature below the crystallization point of paraxylene but above the eutectic point of paraxylene with the next most easily precipitated component of the mixture. Slurry from tank 32 is withdrawn through line 34 containing pump 35 and passed to a chiller such as scraped surface heat exchanger 36. In scraped surface chiller 36 the slurry is chilled to a temperature slightly below that at which the body of slurry is held in holding tank 32 in order to make up for the heat of crystallization and heat losses occurring in holding tank 32 and the slurry then withdrawn through line 37 where the stream is split, with a major portion returned to vessel 32 and a minor portion withdrawn by branch line 38 and discharged to a second separating zone 39 which may be another basket centrifuge and there separated into a mother liquor fraction and cake fraction. The cake is withdrawn through outlet 40 as the desired high purity paraxylene concentrate product and the mother liquor is withdrawn through line 41 containing pump 42 and mixed with the fresh feed in line 12.

Another procedure for carrying out the present invention is shown in Fig. 2. In Fig. 2 a substantially uniform slurry of paraxylene crystals and mother liquor is maintained at an average temperature of approximately −80° F. in first crystallization vessel F for an average residence time within the range of 30 minutes to 3 hours. A second substantially uniform slurry of paraxylene crystals and mother liquor is maintained at a temperature right at but not below the eutectic point of paraxylene, for example −98° F. in vessel G with an average residence time within the range of 30 minutes to 3 hours. For the second stage of purification, a third substantially uniform slurry of paraxylene crystals and mother liquor is maintained at a temperature within the range of −10° to 20° F. in crystallization tank H for an average residence time of within the range of 30 minutes to 3 hours. As will be seen in the drawing, vessels F, G and H are each provided with stirrers and usually the stirrer in each vessel will be operated slowly, say from 10 to 30 R. P. M., to maintain the slurry composition uniform and to aid crystal growth.

Scraped surface chiller C, crystallization vessel F, scraped surface chiller D and crystallization vessel G, together with basket type centrifuge J form the first stage while scraped surface chiller E, crystallization unit H and basket type centrifuge K form the second stage.

Feed stock in line 53 has admixed therewith filtrates from the second stage in line 54, the mixture passing through drier 55. The dried material is passed through line 56 to a heat exchanger 57 where it is cooled by indirect heat exchange with filtrate in line 77, then by line 58 to prechiller 59 where it is chilled to within a few degrees of the crystallization temperature of the mixture, for example within the range of −40 to −50° F. Prechilled mixture from prechiller 59 is passed to line 60, open valve 121 and line 120 into first crystallization vessel F.

A slurry of paraxylene crystals and mother liquor is continuously withdrawn from the bottom of first crystallization vessel F by way of line 62 and pump 63 and the stream is split with a portion passing through line 64 and scraped surface heat exchanger C and returned to crystallization vessel F by way of line 61 and the remainder passing through line 65 and open valve 125 into the second crystallization tank G.

A sufficient amount of the chilled slurry in line 61 is discharged into crystallization vessel F and the remainder is routed by line 65a controlled by valve 61a for admixture with the slurry in line 65 charged to second crystallization tank G.

Normally valve 122 is closed so that the incoming feed stock discharges directly into first crystallization tank F and the recycled slurry passes from scraped surface heat exchanger C back into crystallization tank F. However, if desired, valve 122 may be opened so that some of the slurry may be admixed with incoming feed stock in which case the paraxylene crystals in the recycled slurry serve as seed crystals for the fresh feed as it passes through line 120 prior to discharge into vessel F.

In order to obtain the desired crystals in vessel F, the slurry is chilled in scraped surface heat exchanger C in an amount within the range of 3° to 5° F. below the temperature of tank F with the scrapers within the range of 100 to 600 feet per minute, with a preferable velocity of 400 feet per minute. The scrapers are operated within the range of 10 to 20 scrapes per minute.

In second crystallization tank G, the temperature of the slurry is kept right at but not below the eutectic point of paraxylene with the next most easily precipitated component. A slurry of paraxylene crystals and mother liquor is continuously withdrawn from second crystallization tank G through line 66 and pump 67. From pump 67 the stream passes through line 68 to scraped surface chiller D and the stream is split with a portion being returned to second crystallization vessel G through line 69 and another portion passing to line 70 where it may be diluted with filtrate introduced through line 71 to increase its fluidity and the diluted slurry passed into first basket centrifuge J. Line 71 is provided with valve 71' so that the amount of diluent added to the slurry in line 70 may be controlled as desired. Scraped surface heat exchanger D is operated at a temperature below but not more than 3° F. below the eutectic temperature of paraxylene with the next most easily precipitated component and the residence time of the slurry within the scraped surface heat exchanger D is not greater than two minutes and preferably about 30 seconds with the velocity of the slurry through scraped surface chiller D within the range of 100 to 600 feet per minute with a preferable velocity of 400 feet per minute. The scrapers of scraped surface heat exchanger D are operated at a rate within the range of 10 to 20 scrapes per minute. Such an arrangement assures that the maximum amount of paraxylene crystals is separated in basket type centrifuge J which may be secured without the formation of crystals of other materials making up the feed stock, the limited residence time allowing the actual chilling to be below the eutectic point without any appreciable amount of crystals being formed other than paraxylene. The ratio of recycle through scraped surface chiller D to feed introduced through line 65 is within the range of 10:1 to 20:1.

In the first crystal separation step carried out in basket centrifuge J, a filtrate is separated which is removed by line 72 to surge drum 73. From surge drum 73 the filtrate is removed through line 74 and pump 75 to outlet line 76 where the stream may be split with a portion going through line 71 for diluting the feed to centrifuge J as previously explained while the balance is passed through line 77 and in indirect heat exchange with incoming feed in heat exchanger 57 as previously explained before being discarded from the crystallization and separting system.

From centrifuge J a filter cake is withdrawn through discharge chute 78 into melting drum 79. The melted cake is withdrawn from melting drum 79 through line 80, by pump 81 having outlet line 82. The stream in line 82 is split with a portion passing through line 83 containing heater 84 and discharging into chute 78 for melting the filter cake removed as product from centrifuge J. The other portion is passed through line 85 to be fed into the crystallization tank H.

The paraxylene mixture in line 85 is passed through a prechiller 86 where is it chilled to a temperature immediately above its crystallization point, thence by line 87 to scraped surface heat exchanger E and then through line 88 to the third crystallization vessel H. In order to regulate the solids content of the slurry introduced into third crystallization unit H, it may be desirable to dilute it with filtrate from the second separation step K. For the purpose of introducing this filtrate a manifold L is provided having branches 89, 90, 91 and 92. As will be seen in the drawing, branch 89 discharges into line 85 ahead of prechiller 86 and scraped surface chiller E. Branch line 90 discharges into line 87 between prechiller 86 and scraped surface chiller E. Branch line 91 discharges into scraped surface chiller E while branch line 92 discharges into line 88 which is the outlet line of chiller E. The recycle stream from vessel H flows through the system made up of line 94, pump 95, lines 96, 93, 87, chiller E and line 88. The liquefied paraxylene concentrate being passed from centrifuge J through scraped surface chiller E to third crystallization vessel H is preferably diluted with filtrate from the second stage centrifuge K so that the slurry formed in scraped surface chiller E will contain approximately 20% solids or a total concentration of 54% paraxylene. By way of example, two volumes of filtrate containing 50% paraxylene from second stage centrifuge K may be blended with one volume of first stage concentrate from centrifuge J containing about 75% paraxylene. However, if desired, the slurry formed in chiller E may contain more than 20% solids with the maximum in the range of 30–35%.

The temperature of the slurry in vessel H is preferably within the range of −20 to +20° F. and the velocity of flow through chiller E is maintained within the range of 100 to 600 feet per minute with a preferably velocity of 400 feet per minute. The scrapers of chiller E are operated at a rate within the range of 10 to 20 scrapes per minute.

Paraxylene slurry from third crystallization tank H is withdrawn from the bottom thereof through line 94 and pump 95. This slurry is pumped to outlet line 96 and the stream may be split with a portion going to second stage separating step K and another portion optionally going to branch line 93 for admixture to slurry in line 87. It is preferable to increase the fluidity of the slurry in outlet line 96 which is being discharged to the centrifuge by the introduction of filtrate through branch line 97. In the second crystal separation step carried out in basket centrifuge K, a filtrate is separated and is removed through line 98 to surge drum 99. From surge drum 99 the filtrate is removed by outlet line 100 to pump 101 and pumped through line 102 with the stream split with one portion going through branch line 54 for admixture with fresh feed in line 53 while the other portion goes to branch line 103 and supplies the filtrate in manifold L for admixing the paraxylene feed to third crystallization tank H and the other portion passes through branch line 97 for diluting the paraxylene slurry being fed to centrifuge K.

The filter cake removed from centrifuge K is a desired product from the system and passes through discharge chute 104 into melt tank 105. From melt tank 105 the melt is withdrawn through outlet line 106 and pump 107 where it discharges through outlet line 108. A portion is withdrawn as desired product through branch line 109 while the remainder passes through line 110 containing heater 111 and is discharged into the upper portion of discharge chute 104 to supply sufficient heat to the cake being discharged from centrifuge K to melt the crystals therein so that the mixture in tank 105 is liquefied.

In conducting the process described with reference to Fig. 2 of the drawing an analysis of a typical feed stock (which hereafter will be referred to as solvent xylenes feed) is given in the following table:

Table I

| Component: | Volume percent by infrared analysis |
|---|---|
| Toluene | 2.0 |
| Ethylbenzene | 19.2 |
| Paraxylene | 15.7 |
| Metaxylene | 42.2 |
| Orthoxylene | 20.9 |

With such a feed stock, it will be found advantageous to chill to −40° F. in chiller 59 and to hold the body of slurry in holding tank F for an average time of at least 3 hours and at a temperature right at the eutectic point temperature or approximately −98° F. The amount of slurry withdrawn from holding tank F by recycle line 62 may be within the range of 10 to 20 parts by volume for each part of feed stock charged to holding tank F. The slurry is chilled in scraped surface heat exchanger to a temperature below the eutectic point of the slurry with a total chilling of not over 3° F. The operation described in the first stage results in the forming and growth of paraxylene crystals to such a size that they are separated very readily from the mother liquor in separating stage J.

In the second stage of purification, it will be found desirable to hold the body of slurry in holding tank H at a temperature within the range of +20° to −20° F.

It is the particular advantage of the process of the present invention that relatively large crystals of paraxylene are formed which are more amenable for centrifuging in a basket type centrifuge. It is postulated that the reason that larger size crystals are obtained is that the chilled slurry of crystals into which the feed is discharged form centers of crystal growth and that discharging chilled feed free from paraxylene crystals into the holding tank tends to increase the size of crystals already in the holding tank rather than to form a large number of new small crystals.

The improvement obtained by recycling slurry for the first stage of the process of the present application is shown by the results tabulated in Table II hereafter. In securing the results set out in Table II the feed stock used was a solvent xylenes feed with a composition similar to that shown heretofore in Table I. Four runs were carried out. In the first run substantially no recycle was used. In the remaining three runs the recycle ratios were 10:1, 15:1 and 20:1, respectively.

Table II

[−95 F. slurry temp., 3 hours' holding.]

|  | Run 1 | Run 2 | Run 3 | Run 4 |
|---|---|---|---|---|
| Ratio of Slurry Recycle to Fresh Xylenes Feed. | No Recycle | 10:1 | 15:1 | 20:1 |
| Chilled Xylenes Injection Point | Scraped Surface | (¹) | (¹) | (¹) |
| Typical Crystal Size, Microns: |  |  |  |  |
| Width | 10 | 30 | 25 | 30 |
| Length | 90 | 220 | 230 | 285 |
| Centrifuge Spin Time, Seconds | 100 | 40 | 40 | 40 |
| Product Purity, Wt. Percent Paraxylene. | 72–80 | 78 | 79 | 78 |
| Liquor Drain Rate, Lbs./Sq. Ft. Screen Area/Min. | 30 | 68 | 71 | 72 |

¹ Holding tank.

From Table II it will be seen that injection of the feed into the holding tank and the use of recycle results in crystals of paraxylene of substantially larger size and with substantially improved rates of draining in the centrifuge.

The improvement obtained by injecting the feed into the tank and recycling the slurry under conditions corresponding to the described first stage of the present invention is further shown by results of tests tabulated hereafter in Table III. In carrying out this test a solvent xylenes feed stock, corresponding to that used in Table II, was used with a recycle ratio of 20 parts recycle to one part of test slurry at a temperature of −95° F. and an average holding time of three hours. Five runs were carried out in which the centrifugal spin time was 15 seconds, 30 seconds, two minutes, four minutes and ten minutes, respectively. It will be noted that although an increased spin time results in the increase in the percentage of paraxylene in the cake that the shortest spin time of 15 seconds employed allowed a cake of 76% paraxylene concentration to be obtained in operation corresponding to the first stage of the invention described.

*Table III*

[Centrifugal force of 770 g's.]

| | Run 1 | Run 2 | Run 3 | Run 4 | Run 5 |
|---|---|---|---|---|---|
| Centrifuge Chg. Time, Sec | 40 | 40 | 40 | 40 | 40 |
| Centrifuge Spin Time | 15 Sec. | 30 Sec. | 2 Mins. | 4 Mins. | 10 Mins. |
| Knife Removal of crystals from centrifuge bowl | 15 sec. | | | | |
| Cake Purity, Percent Paraxylene | 76.7 | 79.8 | 82.4 | 88.8 | 89.8 |

The desirable results which may be obtained when employing the second stage of purification of the type shown in Fig. 1 of the drawing are illustrated by the following results:

A paraxylene concentrate containing 58% paraxylene in admixture with other xylenes, as recovered from a preliminary concentration step, was injected into a slurry of substantially the same composition, maintained in a holding tank at a temperature of −15° F. Slurry was circulated through a scraped surface chiller at the rate of 20 volumes of recycle to one volume of feed, and returned to the holding tank. Part of the slurry was withdrawn to a basket centrifuge, and a paraxylene cake of 96.6% purity recovered with 15 seconds centrifuging time.

It is to be emphasized that in carrying out the process of the present invention the paraxylene crystals in the first stage slurry sent to the separating zone are needle-like, large and have very few clusters. In the second stage the crystals are rectangular plates. It is of particular importance that the crystals are substantially uniform in size and shape. As a result the crystals drain very rapidly in the separating steps.

It may be pointed out that although it might be expected that the recycling of a large amount of slurry would increase the amount of heat exchanger area required, this actually is not the case since the heat transfer coefficient increases at higher velocities of flow and hence offsets the lower temperature differential between the heat exchanger surfaces and the material being chilled.

From the foregoing description it will be seen that I have disclosed an improved process for separating a high purity paraxylene concentrate. The feature of the process is the use of a holding tank containing a paraxylene slurry maintained at a temperature approximately at but not below the temperature at which paraxylene forms a eutectic point with the next most easily precipitated component of the feed, the discharge of feed at a higher temperature than the body of slurry into the holding tank and the maintenance of the temperature of the slurry by withdrawing a stream from the body of the slurry, passing it through a scraped surface heat exchanger where it is chilled no more than 3° F. and below the eutectic temperature for a residence time of no more than two minutes and preferably about 30 seconds and returning it to the holding tank. This procedure results in the crystallization of the maximum amount of paraxylene free from crystals of other components making up the feed stock with the crystals of paraxylene in such form that said paraxylene crystals separate very readily in a basket type centrifuge.

While I have disclosed specific embodiments of the present invention, it will be apparent that various changes may be made by a workman skilled in the art without departing from the scope of the invention.

What I wish to claim is:

1. A process for separating paraxylene from a feed stock consisting of a liquid mixture of hydrocarbons including paraxylene in the range from about 12 to 25% by volume and at least one other isomeric xylene and having a eutectic point of paraxylene with the next most easily precipitated component in the neighborhood of −98° F. which comprises the steps of forming from said feed stock a body of slurry consisting of paraxylene crystals and mother liquor maintained at a temperature approximately at but not below said eutectic point, forming a first stream of chilled feed stock and introducing said first stream into said body of slurry, said body of slurry being maintained at approximately said eutectic temperature by withdrawing from said body of slurry a second stream consisting of paraxylene crystals and mother liquor, chilling said second stream in a scraped surface chiller at a velocity within the range of 100 to 600 feet per minute with a residence time not over approximately 30 seconds at a temperature below but not more than 3° F. below the temperature of the body of the slurry and said eutectic point whereby the heat transfer coefficient of said second stream is increased, returning a sufficient amount of said chilled second stream to said body of slurry, and then passing slurry consisting of crystals and mother liquor which has been withdrawn from said body of slurry to a centrifuge and there separating a paraxylene filter cake as product.

2. A process for separating paraxylene from a feed stock consisting of a liquid mixture of hydrocarbons including paraxylene in the range from about 12 to 25% by volume and at least one other isomeric xylene and having a eutectic of paraxylene with the next most easily precipitated component in the neighborhood of −98° F. which comprises the steps of forming from said feed stock a first body of slurry consisting of paraxylene crystals and mother liquor maintained at a temperature of approximately −80° F. and forming from said first body of slurry a second body of slurry consisting of paraxylene crystals and mother liquor maintained at a temperature approximately at but not below said eutectic point, forming a first stream of feed stock at a temperature of approximately −40° F. and free from paraxylene crystals and introducing said chilled first stream into said first body of slurry, withdrawing slurry from said first body and forming it into a second stream, passing said second stream through a first scraped surface heat exchanger and there chilling it in an amount no greater than 5° F., returning a sufficient amount of chilled slurry from said second stream to said first body of slurry to maintain the temperature of said first body of slurry at −80° F. and passing the remainder to said second body of slurry as a third stream, withdrawing slurry from said second body of slurry and passing it through a scraped surface heat exchanger at a rate of flow within the range of 100 to 600 feet per minute with a residence time not over 2 minutes to chill said slurry to a temperature below but not more than 3° F. below the temperature of the body of the slurry and said eutectic point whereby the heat transfer coefficient of said third stream is increased, returning a sufficient amount of said chilled third stream to said second body of slurry to maintain said second body of slurry at substantially said eutectic point and passing the remainder of said chilled second stream to a basket centrifuge and there separating a paraxylene filter cake as product.

3. A process for separating paraxylene from a feed stock consisting of a liquid mixture of hydrocarbons including paraxylene in the range from about 12 to 25% by volume and at least one other isomeric xylene and having a eutectic point of paraxylene with the next most easily precipitated component in the neighborhood of −98° F. which comprises the steps of forming from said feed stock a first body of slurry consisting of paraxylene crystals and mother liquor at a temperature of approximately −80° F., and forming from said first body of slurry a second body of slurry consisting of paraxylene crystals and mother liquor maintained at a temperature approximately −98° F. and at but not below said eutectic point, forming a first stream of chilled feed stock at a temperature of approximately −40° F. and continuously introducing said first stream into said first body of slurry, withdrawing from said first body of slurry a second stream consisting of paraxylene crystals and mother liquor as recycle stream having a volume ratio within the range of 10:1 to 20:1 with respect to the feed stock, passing said second recycle stream through a first scraped surface chiller at a velocity with the range of 100 to 600 feet per minute and chilling it therein to an amount within the range of from 3° to 5° F. below the temperature of said first body of slurry and returning a major portion of the chilled second stream of said first body of slurry to maintain its temperature at −80° F., continuously passing an amount of the chilled second stream substantially equal in volume to said first stream into said second body of slurry, continuously withdrawing from said second body of slurry a third stream of slurry, passing it through a second scraped surface chiller at a velocity within the range of 100 to 600 feet per minute with a residence time not over 2 minutes to chill it to a temperature below but not more than 3° F. below the temperature of said second body of slurry and said eutectic point, the heat transfer coefficient of said second and third streams being increased by passing said second and third streams at said velocities through the first and second scraped surface chillers, respectively, said volume of the third stream being within the ratio of 10 to 20 volumes per volume of incoming feed, returning a major portion of said slurry discharged from said second scraped surface heat exchanger into said second body of slurry to maintain the temperature of said second body of slurry at approximately said eutectic point and withdrawing a portion of the slurry discharged from said second scraped surface heat exchanger and passing to a basket centrifuge and there separating a paraxylene filter cake as product.

4. A method in accordance with claim 3 in which the paraxylene filter cake separated in the basket centrifuge is further purified by being melted, chilled to a temperature within the range of 20° to −20° F. to form a slurry of paraxylene crystals in mother liquor and said slurry passed to a second basket centrifuge to separate a second cake of high purity paraxylene crystals from mother liquor and recovering said second cake as product.

References Cited in the file of this patent
UNITED STATES PATENTS

| | | |
|---|---|---|
| 2,541,682 | Arnold | Feb. 13, 1951 |
| 2,672,487 | Tegge et al. | Mar. 16, 1954 |
| 2,688,045 | Powers et al. | Aug. 31, 1954 |